(12) United States Patent
Reimers et al.

(10) Patent No.: US 11,525,041 B2
(45) Date of Patent: Dec. 13, 2022

(54) PROCESS FOR PRODUCING POLYMERS

(71) Applicant: ExxonMobil Chemical Patents Inc., Baytown, TX (US)

(72) Inventors: Jay L. Reimers, Houston, TX (US); Yifeng Hong, Houston, TX (US); Anthony J. Dias, Houston, TX (US); John R. Hagadorn, Houston, TX (US)

(73) Assignee: EXXONMOBIL CHEMICALS PATENTS INC., Baytown, TX (US)

(*) Notice: Subject to any disclaimer, the term of this patent is extended or adjusted under 35 U.S.C. 154(b) by 889 days.

(21) Appl. No.: 16/406,119

(22) Filed: May 8, 2019

(65) Prior Publication Data
US 2019/0382540 A1    Dec. 19, 2019

Related U.S. Application Data

(60) Provisional application No. 62/685,439, filed on Jun. 15, 2018.

(51) Int. Cl.
B29B 9/06 (2006.01)
C08J 3/14 (2006.01)
C08F 210/16 (2006.01)

(52) U.S. Cl.
CPC ............... C08J 3/14 (2013.01); C08F 210/16 (2013.01); C08J 2323/14 (2013.01)

(58) Field of Classification Search
CPC ........ C08J 3/14; C08J 2323/14; C08F 210/16; C08F 4/65908; C08F 2410/01; C08F 2420/10; C08F 110/14; C08K 5/0083; C08K 5/1575
USPC ........................................................ 264/143
See application file for complete search history.

(56) References Cited

U.S. PATENT DOCUMENTS

| | | | |
|---|---|---|---|
| 5,856,385 A | 1/1999 | Mehrer et al. | |
| 5,973,043 A | 10/1999 | Miley et al. | |
| 2005/0239926 A1 | 10/2005 | Xie et al. | |
| 2016/0319166 A1* | 11/2016 | Schroeyers | C08K 5/0016 |
| 2019/0127552 A1* | 5/2019 | Montoya | B29C 51/002 |

FOREIGN PATENT DOCUMENTS

EP    3 184 584 A    6/2017

* cited by examiner

Primary Examiner — Prem C Singh
Assistant Examiner — Francis C Campanell

(57) ABSTRACT

A process for the synthesis of a granular polymer, the process comprising (a) providing an active polymerization mixture that includes polymer, monomer, catalyst and optional solvent; (b) introducing a hydroxy-containing diaryl acetyl compound to the active polymerization mixture to thereby provide an inactive polymer mixture; (c) separating the polymer solution into a first stream and a second stream, where the first stream includes the polymer and the hydroxy-containing diaryl acetyl compound, and the second stream includes the monomer and the optional solvent; and (d) fabricating granules from the first stream.

20 Claims, No Drawings

PROCESS FOR PRODUCING POLYMERS

CROSS-REFERENCE TO RELATED APPLICATIONS

This application claims priority to U.S. Ser. No. 62/685,439, filed Jun. 15, 2018, herein incorporated by reference.

FIELD OF THE INVENTION

Embodiments of the present invention are directed toward a process of preparing a polymer that includes the quenching of an active polymerization using a hydroxyl-containing diaryl acetyl compound as a quenching agent. The invention also includes the use of a hydroxy-containing diaryl acetyl compound as a quenching agent and a nucleation agent.

BACKGROUND OF THE INVENTION

Pelletization is often an important step in production of polymers, especially thermoplastic polymers. Two common pelletization techniques are strand pelletizing and die-face pelletizing. Strand pelletizing includes cutting solidified polymer strands that have been cooled from their molten state. Die-face pelletizing includes cutting polymer strands as the polymer leaves the die hole and then subsequently introducing the cut product into a cooling medium, such as water, to cool, solidify, and transport the fresh pellets. Where the die-face process employs water as the cooling medium, the process is often referred to as underwater pelletizing. Die-face pelletizing is often used in the commercial production of many polyolefins because of its advantageous throughput, automation, pellet quality, and application range.

In underwater pelletizing, the cutting takes place within a contained water chamber with high cutter speed. The shape and agglomeration of pellets are affected by the characteristics of the polymers, especially molecular weight and crystallinity, both of which highly influence the material viscosity and elasticity. Water temperature, water to pellet ratio, and anti-block additives also play important roles on the quality of pellets.

The process conditions of underwater pelletizing can be optimized to lower the capital investment and operation cost. For example, the water temperature is typically high so that the pellets are more easily dried in a subsequent drying step. Water to pellet ratio decreases the cost of pumps, as well as the energy required to run the process. The amount of anti-block agent can be limited to avoid overdosing, which may cause environmental issues and reduce product performance.

To create stable pellets with good quality, the molten polymer pellets need to reach a critical viscosity when cut in underwater pelletization. Generally, high molecular weight and fast crystallization rate can accelerate the increase in viscosity. However, some materials, for example, elastomers, have relatively low molecular weight and/or low crystallinity because of their application areas, which makes them difficult to pelletize.

Polymerization processes for producing polymers, such as polyolefins, typically require quenching agents to prevent further polymerization of the monomers after a desired amount of polymer has been produced. After polymerization, the removal of solvents and/or unreacted monomers from the final product occurs via a separation and recovery step. The solvents and/or monomers can subsequently be recycled back into the polymerization process.

Traditionally, small, polar, protic molecules, such as water and methanol, are used as quenching agents. However, their use is problematic because they can partition in all of the effluent streams during the separation and recovery. This may be the case for both liquid-liquid separations and liquid-vapor separations. Consequently, a recycle stream containing separated solvent and/or unreacted monomer may also contain varying amounts of these quenching agents, which, if recycled back into the polymerization process, can poison fresh catalyst. Further processing steps, including the use of treater beds and scavengers, are needed to remove the traditional polar quenching agents from a recycle stream. These steps are undesirable because they increase capital and operating costs. For example, treater beds require frequent regeneration and scavengers are costly.

SUMMARY OF THE INVENTION

One or more embodiments of the present invention provides a process for the synthesis of a granular polymer, the process comprising (a) providing an active polymerization mixture that includes polymer, monomer, catalyst and optional solvent; (b) introducing a hydroxy-containing diaryl acetyl compound to the active polymerization mixture to thereby provide an inactive polymer mixture; (c) separating the polymer solution into a first stream and a second stream, where the first stream includes the polymer and the hydroxy-containing diaryl acetyl compound, and the second stream includes the monomer and the optional solvent; and (d) fabricating granules from the first stream.

Other embodiments of the present invention further provides a process for the synthesis of a granular polymer, the process comprising (a) polymerizing one or more monomers in the presence of a solvent within a first zone to produce an active polymer mixture including solvent, polymer, and monomer; (b) inactivating the active polymerization mixture by introducing a hydroxy-containing diaryl acetyl compound to the active polymer mixture within a second zone to thereby produce a polymerization mixture including inactive polymer, inactive catalyst, monomer, and solvent; (c) separating the polymerization mixture within a third zone, where said step of separating produces a first stream and a second stream, where the first stream includes the polymer and the hydroxy-containing diaryl acetyl compound, and the second stream includes the monomer and the solvent; and (d) fabricating granules from the first stream.

DETAILED DESCRIPTION OF ILLUSTRATIVE EMBODIMENTS

Introduction

Embodiments of the present invention are based, at least in part, on the discovery of a polymer production process that employs a hydroxy-containing diaryl acetal compound as a quenching agent. This compound not only advantageously quenches the polymerization mixture, but it also partitions with the polymer during the separation and recovery process. As a result, the monomer and solvent recycle streams are substantially free of quenching agent, which reduces the degree of purification that is required before this stream can be introduced back to the process. And, moreover, the resultant polymer product has increased pelletization potential, which is believed to result from the hydroxy-containing diaryl acetal compound acting as a nucleation agent, thereby increasing the crystallization rate of the polymer. These results are extremely advantageous for the production of certain polyolefins, such as propylene-based elastomers, which have traditionally been difficult to pelletize. Accordingly, embodiments of the present invention are directed toward processes for the production of polymer, especially polyolefins such as propylene-based elastomers, wherein a hydroxy-containing diaryl acetal compound is employed as a quenching agent and the polymer product is subsequently pelletized.

Process Overview

Embodiments of the invention can be described with reference to a polymerization mixture, which may also be referred to as a polymerization solution. In one or more embodiments, the polymerization mixture includes catalyst, polymer, monomer, and optionally a solvent. Where the catalyst is active, which refers to a catalyst that is capable of achieving further polymer chain propagation, and/or the polymerization mixture includes active polymer chains, which are chains capable of further chain growth through reaction or interaction with an active catalyst species, then reference may be made to an active polymerization mixture or active polymerization solution. According to aspects of the present invention, a hydroxy-containing diaryl acetal compound is introduced to an active polymerization solution, which compound serves to quench the polymerization solution. In one or more embodiments, the quenched polymerization solution may be referred to as an inactive polymerization solution. The polymerization mixture then undergoes separation and recovery to produce a resultant polymer product, which includes polymer and hydroxy-containing diaryl acetal compound, and this polymer product is then pelletized.

Formation of Polymerization Mixture

In one or more embodiments, the polymerization mixture may be prepared by a polymerization processes that operates by solution, suspension, slurry, or gas-phase polymerizations. These processes may be run in a batch, semi-batch, or continuous mode. As those skilled in the art will appreciate, a continuous polymerization process may be operated without interruption or cessation. For example, a continuous process to produce a polymer is a process where the reactants are continually introduced into one or more reactors and polymer product is continually withdrawn.

In one or more embodiments, the polymerization employed in the present invention may be a homogeneous polymerization. Homogeneous polymerization processes include those processes where a substantial portion of the product (e.g. at least 90 wt. %) is soluble in the reaction media. Homogeneous polymerization processes include solution phase and bulk-phase processes. As those skilled in the art will appreciate, a bulk-phase process, or a bulk polymerization, is a polymerization process in which the monomers and/or comonomers being polymerized are used as a solvent or diluent. In one or more embodiments, a small amount of solvent might be used as a carrier for the catalyst system or other additives, or amounts typically found with the monomer, e.g., propane in propylene. In one or more embodiments, the bulk polymerization system may include less than 25%, in other embodiments less than 10%, in other embodiments less than 5%, and in other embodiments less than 1% solvent as a weight percentage based upon weight of the total polymerization solution.

In one or more embodiments, the polymerization employed in the present invention may be a solution-phase polymerization, which may also be referred to as a solution polymerization. Solution polymerization processes include those processes where the polymer is dissolved in a liquid polymerization medium, such as an inert solvent. In other words, a solvent may be present during the polymerization process. Suitable diluents/solvents for the polymerization processes, and which therefore may be present in the polymerization mixture of the present invention, include non-coordinating, inert liquids. Examples include straight and branched-chain hydrocarbons, such as isobutane, butane, pentane, isopentane, hexane, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_4$ to $C_{10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In particular embodiments, aliphatic hydrocarbon solvents are used as the solvent, such as isobutane, butane, pentane, isopentane, hexane, isohexane, heptane, octane, dodecane, and mixtures thereof; cyclic and alicyclic hydrocarbons, such as cyclohexane, cycloheptane, methylcyclohexane, methylcycloheptane, and mixtures thereof. Alternatively, the solvent is not aromatic, and aromatics are present in the solvent at less than 1 wt. %, in other embodiments less than 0.5 wt. %, and in other embodiments 0 wt. % based upon the weight of the solvents. In particular embodiments, the feed concentration of the monomers and comonomers for the polymerization is 60 vol. % solvent or less, in other embodiments 40 vol. % or less, or in other embodiments 20 vol. % or less, based on the total volume of the feedstream.

In one or more embodiments, the polymerization process may be performed at a temperature of about 50° C. to about 220° C., in other embodiments about 70° C. to about 210° C., in other embodiments about 90° C. to about 200° C., in other embodiments from 100° C. to 190° C., and in other embodiments from 130° C. to 160° C. In these or other embodiments, the polymerization process may be conducted at a pressure of from about 120 to about 1,800 psi (830 to 12,000 kPa), in other embodiments from 200 to 1,000 psi (1400 to 6900 kPa), and in other embodiments from 300 to 600 psi (2100 to 4100 kPa). In one or more embodiments, the pressure is about 450 psi (3100 kPa). In one or more embodiments, hydrogen may be present during the polymerization process. In these or other embodiments, hydrogen may be present at a partial pressure of about 0.001 to about 50 psig (0.007 to 350 kPa gauge (kPag)), in other embodiments from about 0.01 to about 25 psig (0.07 to 170 kPag), and in other embodiments from about 0.1 to about 10 psig (0.7 to 70 kPag).

Monomer & Comonomer

In one or more embodiments, monomers that may be polymerized in practicing the present invention include olefin and diolefin monomers. Olefin monomers include substituted or unsubstituted $C_2$ to $C_{40}$ olefins, preferably $C_2$ to $C_{20}$ olefins, preferably $C_2$ to $C_{12}$ olefins, preferably $C_2$ to $C_5$ olefins, preferably $C_2$ to $C_4$ olefins. Exemplary $C_2$ to $C_{40}$ olefin monomers and, optional, comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene.

Useful diolefin monomers include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). In one or more embodiments, the diolefin monomers can be selected from alpha, omega-diene monomers (i.e., di-vinyl monomers). In one or more embodiments, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, and triacontadiene. Particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes ($M_w$ less than 1000 g/mol). Preferred cyclic dienes include cyclopentadiene, vinylnorbornene, norbornadiene, ethylidene norbornene, divinylbenzene, dicyclopentadiene, or higher ring containing diolefins, with or without substituents at various ring positions.

In one or more embodiments, where a diene monomer is employed, one or more dienes are present in the polymer produced (i.e. diene residue or mer units) at up to 10 wt. %, preferably at 0.00001 to 1.0 wt. %, preferably 0.002 to 0.5 wt. %, even more preferably 0.003 to 0.2 wt. %, based upon the total weight of the composition. Often, 500 ppm or less of diene is added to the polymerization, in certain embodiments 400 ppm or less, or in certain embodiments 300 ppm or less. Alternatively, at least 50 ppm of diene is added to the polymerization, or 100 ppm or more, or 150 ppm or more.

In one or more embodiments, the monomers employed include propylene and an optional comonomer. Suitable comonomers for use with propylene include one or more $C_2$ olefin (ethylene) or $C_4$ to $C_{40}$ olefins, such as $C_4$ to $C_{20}$ olefins, or such as $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may, optionally, include heteroatoms and/or one or more functional groups. In particular, the hydrocarbon monomer comprises ethylene and/or propylene.

In another embodiment, the monomers employed include ethylene and an optional comonomer. Suitable comonomers for use with ethylene include one or more $C_3$ to $C_{40}$ olefins, such as $C_4$ to $C_{20}$ olefins, or in other embodiments $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may, optionally, include heteroatoms and/or one or more functional groups.

Catalyst System

In one or more embodiments, the polymerization mixture may be formed by polymerizing monomer with a catalyst system including a catalyst compound, which may also be referred to as a catalyst precursor, and an activator. The term catalyst system may refer to a pair before activation or the unactivated catalyst (pre-catalyst) together with an activator and, optionally, a co-activator. Also, the term catalyst system may refer to a pair after activation or the activated catalyst and the activator or other charge-balancing moiety. In one or more embodiments, the catalyst system may also include more than one catalyst precursor and/or more than one activator and optionally a co-activator. In one or more embodiments, the catalyst system may include more than one activated catalyst and one or more activator or other charge-balancing moiety, and optionally a co-activator.

Catalysts suitable for the polymerization process may generally contain a transition metal of groups 3 to 10 of the Periodic Table or a lanthanide or actinide metal, and at least one ancillary ligand that remains bonded to the transition metal during polymerization.

In one or more embodiments of the present invention, the catalyst systems used for producing the polymer include a metallocene compound. In some embodiments, the metallocene compound is a bridged bisindenyl metallocene having the general formula $(In^1)Y(In^2)MX_2$, where $In^1$ and $In^2$ are identical substituted or unsubstituted indenyl groups bound to M and bridged by Y, Y is a bridging group in which the number of atoms in the direct chain connecting $In^1$ with $In^2$ is from 1 to 8 and the direct chain comprises C or Si, and M is a Group 3, 4, 5, or 6 transition metal. $In^1$ and $In^2$ may be substituted or unsubstituted. If $In^1$ and $In^2$ are substituted by one or more substituents, the substituents are selected from the group consisting of a halogen atom, $C_1$ to $C_{10}$ alkyl, $C_5$ to $C_{15}$ aryl, $C_6$ to $C_{25}$ alkylaryl, and N- or P-containing alkyl or aryl. Exemplary metallocene compounds of this type include, but are not limited to, µ-dimethylsilylbis(indenyl)hafniumdimethyl and µ-dimethylsilylbis(indenyl)zirconiumdimethyl.

In other embodiments, the metallocene compound may be a bridged bisindenyl metallocene having the general formula $(In^1)Y(In^2)MX_2$, where $In^1$ and $In^2$ are identical 2,4-substituted indenyl groups bound to M and bridged by Y, Y is a bridging group in which the number of atoms in the direct chain connecting $In^1$ with $In^2$ is from 1 to 8 and the direct chain comprises C or Si, and M is a Group 3, 4, 5, or 6 transition metal. $In^1$ and $In^2$ are substituted in the 2 position by a methyl group and in the 4 position by a substituent selected from the group consisting of $C_5$ to $C_{15}$ aryl, $C_6$ to $C_{25}$ alkylaryl, and N- or P-containing alkyl or aryl. Exemplary metallocene compounds of this type include, but are not limited to, (µ-dimethylsilyl)bis(2-methyl-4-(3,'5'-di-tert-butylphenyl)indenyl)zirconiumdimethyl, (µ-dimethylsilyl)bis(2-methyl-4-(3,'5'-di-tert-butylphenyl)indenyl)hafniumdimethyl, (µ-dimethylsilyl)bis(2-methyl-4-naphthylindenyl)zirconiumdimethyl, (µ-dimethylsilyl)bis(2-methyl-4-naphthylindenyl)hafniumdimethyl, (µ-dimethylsilyl)bis(2-methyl-4-(N-carbazyl)indenyl)zirconiumdimethyl, and (µ-dimethylsilyl)bis(2-methyl-4-(N-carbazyl)indenyl)hafniumdimethyl.

Alternatively, in one or more embodiments of the present invention, the metallocene compound may correspond to one or more of the formulas disclosed in U.S. Pat. No. 7,601,666. These metallocene compounds include, but are not limited to, dimethylsilyl bis(2-(methyl)-5,5,8,8-tetramethyl-5,6,7,8-tetrahydrobenz(f)indenyl)hafnium dimethyl, diphenylsilyl bis(2-(methyl)-5,5,8,8-tetramethyl-5,6,7,8-tetrahydrobenz(f)indenyl)hafnium dimethyl, diphenylsilyl bis(5,5,8,8-tetramethyl-5,6,7,8-tetrahydrobenz(f)indenyl)hafnium dimethyl, diphenylsilyl bis(2-(methyl)-5,5,8,8-tetramethyl-5,6,7,8-tetrahydrobenz(f)indenyl)zirconium dichloride, and cyclo-propylsilyl bis(2-(methyl)-5,5,8,8-tetramethyl-5,6,7,8-tetrahydrobenz(f)indenyl)hafnium dimethyl.

In one or more embodiments of the present invention, the activators of the catalyst systems used to produce polymers comprise a cationic component. In some embodiments, the cationic component has the formula $[R^1R^2R^3AH]^+$, where A is nitrogen, $R^1$ and $R^2$ are together a $-(CH_2)_a-$ group, where a is 3, 4, 5 or 6 and form, together with the nitrogen atom, a 4-, 5-, 6- or 7-membered non-aromatic ring to which, via adjacent ring carbon atoms, optionally one or more aromatic or heteroaromatic rings may be fused, and $R^3$ is $C_1$, $C_2$, $C_3$, $C_4$ or $C_5$ alkyl, or N-methylpyrrolidinium or N-methylpiperidinium. In other embodiments, the cationic component has the formula $[R_nAH]^+$, where A is nitrogen, n is 2 or 3, and all R are identical and are $C_1$ to $C_3$ alkyl groups, such as for example trimethylammonium, trimethylanilinium, triethylammonium, dimethylanilinium, or dimethylammonium.

In one or more embodiments of the present invention, the activators of the catalyst systems used to produce the polymers comprise an anionic component, $[Y]^-$. In some embodiments, the anionic component is a non-coordinating anion (NCA), having the formula $[B(R^4)_4]^-$, where $R^4$ is an aryl group or a substituted aryl group, of which the one or more substituents are identical or different and are selected from the group consisting of alkyl, aryl, a halogen atom, halogenated aryl, and haloalkylaryl groups. In one or more embodiments, the substituents are perhalogenated aryl groups, or perfluorinated aryl groups, including but not limited to perfluorophenyl, perfluoronaphthyl and perfluorobiphenyl.

Together, the cationic and anionic components of the catalyst systems described herein form an activator compound. In one or more embodiments of the present invention, the activator may be N,N-dimethylanilinium-tetra(perfluorophenyl)borate, N,N-dimethylanilinium-tetra(perfluoronaphthyl)borate, N,N-dimethylanilinium-tetrakis(perfluorobiphenyl)borate, N,N-dimethylanilinium-tetrakis(3,5-bis(trifluoromethyl)phenyl)borate, triphenylcarbenium-tetra(perfluorophenyl)borate, triphenylcarbenium-tetra(perfluoronaphthyl)borate, triphenylcarbenium-tetrakis(perfluorobiphenyl)borate, or triphenylcarbenium-tetrakis(3,5-bis(trifluoromethyl)phenyl)borate.

Any catalyst system resulting from any combination of a metallocene compound, a cationic activator component, and an anionic activator component mentioned in the preceding paragraphs shall be considered to be explicitly disclosed herein and may be used in accordance with the present invention in the polymerization of one or more olefin monomers. Also, combinations of two different activators can be used with the same or different metallocene(s).

Suitable activators for the processes of the present invention also include alominoxanes (or alumoxanes) and aluminum alkyls. Without being bound by theory, an alumoxane is typically believed to be an oligomeric aluminum compound represented by the general formula $(R^x-Al-O)_n$, which is a cyclic compound, or $R^x(R^x-Al-O)_nAlR^x_2$, which is a linear compound. Most commonly, alumoxane is believed to be a mixture of the cyclic and linear compounds. In the general alumoxane formula, $R^x$ is independently a $C_1-C_{20}$ alkyl radical, for example, methyl, ethyl, propyl, butyl, pentyl, isomers thereof, and the like, and n is an integer from 1-50. In one or more embodiments, $R^x$ is methyl and n is at least 4. Methyl alumoxane (MAO), as well as modified MAO containing some higher alkyl groups to improve solubility, ethyl alumoxane, iso-butyl alumoxane, and the like are useful for the processes disclosed herein.

Further, the catalyst systems suitable for use in the present invention may contain, in addition to the transition metal compound and the activator described above, additional activators (co-activators) and/or scavengers. A co-activator is a compound capable of reacting with the transition metal complex, such that when used in combination with an activator, an active catalyst is formed. Co-activators include alumoxanes and aluminum alkyls.

In some embodiments of the invention, scavengers may be used to "clean" the reaction of any poisons that would otherwise react with the catalyst and deactivate it. Typical aluminum or boron alkyl components useful as scavengers are represented by the general formula $R^xJZ_2$ where J is aluminum or boron, $R^x$ is a $C_1-C_{20}$ alkyl radical, for example, methyl, ethyl, propyl, butyl, pentyl, and isomers thereof, and each Z is independently $R^x$ or a different univalent anionic ligand such as halogen (Cl, Br, I), alkoxide ($OR^x$) and the like. Exemplary aluminum alkyls include triethylaluminum, diethylaluminum chloride, ethylaluminium dichloride, tri-iso-butylaluminum, tri-n-octylaluminum, tri-n-hexylaluminum, trimethylaluminum and combinations thereof. Exemplary boron alkyls include triethylboron. Scavenging compounds may also be alumoxanes and modified alumoxanes including methylalumoxane and modified methylalumoxane.

In some embodiments, the catalyst system used to produce the propylene-based polymers comprises a transition metal component which is a bridged bisindenyl metallocene having the general formula $(In^1)Y(In^2)MX_2$, where $In^1$ and $In^2$ are identical substituted or unsubstituted indenyl groups bound to M and bridged by Y, Y is a bridging group in which the number of atoms in the direct chain connecting $In^1$ with $In^2$ is from 1 to 8 and the direct chain comprises C or Si, and M is a Group 3, 4, 5, or 6 transition metal. $In^1$ and $In^2$ may be substituted or unsubstituted. If $In^1$ and $In^2$ are substituted by one or more substituents, the substituents are selected from the group consisting of a halogen atom, $C_1$ to $C_{10}$ alkyl, $C_5$ to $C_{15}$ aryl, $C_6$ to $C_{25}$ alkylaryl, and N- or P-containing alkyl or aryl. In one or more embodiments, the transition metal component used to produce the propylene-based polymers is μ-dimethylsilylbis(indenyl)hafniumdimethyl.

Additional Additives

In addition to the catalyst, polymer, monomer, and optional a solvent, the polymerization mixture may include other constituents or additives that may be used in the polymerization. These other additives include, but are not limited to, one or more of, scavengers, promoters, modifiers, chain transfer agents, co-activators, reducing agents, oxidizing agents, hydrogen, aluminum alkyls, or silanes. Aluminum alkyl compounds, which may be utilized as scavengers or co-activators, include, for example, one or more of those represented by the formula $AlR_3$, where each R is, independently, a $C_1-C_8$ aliphatic radical, preferably methyl, ethyl, propyl, butyl, pentyl, hexyl, octyl, or an isomer thereof), especially trimethylaluminum, triethylaluminum, triisobutylaluminum, tri-n-hexylaluminum, tri-n-octylaluminum, or mixtures thereof.

In one or more embodiments, little or no scavenger is used in the process to produce the polymer. In certain embodiments, scavenger (such as trialkyl aluminum, $AlR_3$ as defined above) is present at zero mol %, alternately the scavenger is present at a molar ratio of scavenger metal to transition metal of less than 100:1, preferably less than 50:1, preferably less than 15:1, preferably less than 10:1.

Polymer

As those skilled in the art will appreciate, the polymer within the polymerization mixture includes the polymerization product of the monomer as synthesized by the catalyst and polymerization conditions. In one or more embodiments, the polymer includes homopolymers or copolymers of the monomers described above. In one or more embodiments, the polymer is a polyolefin such as an ethylene-based polyolefin or a propylene-base polyolefin.

In particular embodiments, the polymer prepared by the polymerization of monomer is a propylene-based elastomer. Propylene-based elastomers are copolymers including propylene-derived units, alpha-olefin-derived units, and optionally diene-derived units. In other words, the propylene-based elastomers are prepared from the polymerization of propylene, at least one alpha-olefin monomer other than propylene, which alpha-olefins include ethylene, and optionally diene monomer. In particular embodiments, the alpha-olefin monomer other than propylene includes ethylene and $C_4$ (i.e. butene) or higher alpha-olefin. In particular embodiments, the propylene-based elastomers are prepared from the polymerization of propylene and ethylene. In this regard, the embodiments described below may be discussed with reference to ethylene as the alpha-olefin comonomer, but the embodiments are equally applicable to other propylene-based elastomers with other alpha-olefin-derived units.

In one or more embodiments, the propylene-based elastomer may be characterized by comonomer content, which as described below, can be determined by 4D GPC analysis. In one or more embodiments, the propylene-based elastomers synthesized according to the present invention include propylene-derived units and greater than 3.0 wt. %, in other embodiments greater than 3.5 wt. %, in other embodiments greater than 3.8 wt. %, and in other embodiments greater than 4.0 wt. % ethylene-derived units, based upon the entire weight of the copolymer (i.e. the total weight of the propylene-derived and ethylene-derived units). In these or other embodiments, the propylene-based elastomers include propylene-derived units and less than 25 wt. %, in other embodiments less than 15 wt. %, in other embodiments less than 8.0 wt %, and in other embodiments less than 6.0 wt. % ethylene-derived units, based upon the entire weight of the copolymer. In one or more embodiments, the propylene-based elastomers include propylene-derived units and from about 3.0 to about 25 wt. %, from about 3.5 to about 15 wt. %, from about 3.8 to about 8.0 wt. %, and from about 4.0 to about 6.0 wt. % ethylene-derived units, based upon the entire weight of the copolymer.

In one or more embodiments, the propylene-based elastomers synthesized according to the present invention also include diene-derived units. In these embodiments, the propylene-based elastomers include propylene-derived units, ethylene-derived units as set forth above, and greater than 0.5 wt. %, in other embodiments greater than 2.0 wt. %, in other embodiments greater than 5.0 wt. %, and in other embodiments greater than 7.0 wt. % diene-derived units, based upon the entire weight of the copolymer (i.e. the total weight of the propylene-derived, ethylene-derived, and diene-derived units). In these or other embodiments, the propylene-based elastomers include propylene-derived units, ethylene-derived units as set forth above, and less than 20 wt. %, in other embodiments less than 15 wt. %, in other embodiments less than 10 wt. %, and in other embodiments less than 5.0 wt. % diene-derived units, based upon the entire weight of the copolymer. In one or more embodiments, the propylene-based elastomers include propylene-derived units, ethylene-derived units as set forth above, and from about 1.0 to about 25 wt. %, from about 2.0 to about 20 wt. %, from about 4.0 to about 15 wt %, and from about 5.0 to about 12 wt. % diene-derived units, based upon the entire weight of the copolymer.

The propylene-based elastomers can be characterized by a melting point (Tm), which can be determined by differential scanning calorimetry (DSC), where the maximum of the highest temperature peak is considered to be the melting point of the polymer. A "peak" in this context is defined as a change in the general slope of the DSC curve (heat flow versus temperature) from positive to negative, forming a maximum without a shift in the baseline where the DSC curve is plotted so that an endothermic reaction would be shown with a positive peak.

As used within this specification, DSC procedures for determining Tm and Hf include the following. The elastomer is pressed at a temperature of from about 200 to about 230° C. in a heated press, and the resulting polymer sheet is hung, under ambient conditions, in the air to cool. About 6 to 10 mg of the polymer sheet is removed with a punch die. This 6 to 10 mg sample is annealed at room temperature for about 80 to 100 hours. At the end of this period, the sample is placed in a DSC (Perkin Elmer Pyris One Thermal Analysis System) and cooled to about −50° C. to about −70° C. The sample is heated at 10° C./min to attain a final temperature of about 200° C. The sample is kept at 200° C. for 5 minutes and a second cool-heat cycle is performed. Events from both cycles are recorded. The thermal output is recorded as the area under the melting peak of the sample, which typically occurs between about 0 and about 200° C., is measured in Joules, and is a measure of the Hf of the polymer.

In one or more embodiments, the Tm of the propylene-based elastomer (as determined by DSC) is less than 120° C., in other embodiments less than 115° C., in other embodiments less than 110° C., and in other embodiments less than 105° C. In one or more embodiments, the Tm of the propylene-based elastomer is from about 85 to about 120° C., in other embodiments from about 90 to about 115° C., and in other embodiments from about 95 to about 110° C.

In one or more embodiments, the propylene-based elastomer may be characterized by a heat of fusion (Hf), as determined by DSC, of greater than 0.5 J/g, in other embodiments greater than 3.0 J/g, in other embodiments greater than 6.0 J/g, in other embodiments greater than 10 J/g, in other embodiments greater than 15 J/g, in other embodiments greater than 20 J/g, and in other embodiments greater than 30 J/g. In these or other embodiments, the propylene-based elastomer may be characterized by an Hf of less than about 80 J/g, in other embodiments less than 75 J/g, in other embodiments less than 70 J/g, in other embodiments less than 65 J/g, and in other embodiments less than 60 J/g. In one or more embodiments, the propylene-based elastomer has an Hf of from about 30 to about 75 J/g, in other embodiments from about 6 to about 70 J/g, and in other embodiments from about 10 to about 60 J/g.

In one or more embodiments, the propylene-based elastomer can have a weight average molecular weight (Mw) of from about 100,000 to about 500,000 g/mol, in other embodiments from about 125,000 to about 400,000 g/mol, in other embodiments from about 150,000 to about 300,000 g/mol, and in other embodiments from about 175,000 to about 250,000 g/mol. In one or more embodiments, the propylene-based copolymer can have a number average molecular weight (Mn) of from about 50,000 to about 250,000 g/mol, in other embodiments from about 60,000 to about 200,000 g/mol, in other embodiments from about 70,000 to about 150,000 g/mol, and in other embodiments from about 80,000 to about 125,000 g/mol. In one or more embodiments, the propylene-based elastomer may have a molecular weight distribution (Mw/Mn) of from about 0.5 to about 5.0, in other embodiments from about 1.0 to about 4.0, in other embodiments from about 1.5 to about 3.5, and in other embodiments from about 2.0 to about 3.0.

Unless otherwise indicated, the distribution and the moments of molecular weight (Mp, Mw, Mn, Mz, Mw/Mn, etc.) and the comonomer content (C2, C3, C6, etc.) are determined by using a high temperature Gel Permeation Chromatography (Polymer Char GPC-IR) equipped with a multiple-channel band-filter based Infrared detector IR5, an 18-angle light scattering detector and a viscometer (which may be referred to as 4D hPC analysis). Three Agilent PLgel 10-μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1-μm Teflon filter and degassed with an online degasser before entering the GPC instrument. The nominal flow rate is 1.0 ml/min and the nominal injection volume is 200 μL. The whole system including transfer lines, columns, and detectors are contained in an oven maintained at 145° C. Given amount of polymer sample is weighed and sealed in a standard vial with 80-μL flow marker (Heptane) added to it. After loading the vial in the autosampler, polymer is automatically dissolved in the instrument with 8 ml added TCB solvent. The polymer is dissolved at 160° C. with continuous shaking for about 1 hour for most polyethylene samples or 2 hours for polypropylene samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples. The concentration (c), at each point in the chromatogram is calculated from the baseline-subtracted IR5 broadband signal intensity (I), using the following equation: $c=\beta I$, where $\beta$ is the mass constant. The mass recovery is calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with following equation:

$$\log M = \frac{\log(K_{PS}/K)}{\alpha + 1} + \frac{\alpha_{PS} + 1}{\alpha + 1} \log M_{PS},$$

where the variables with subscript "PS" stand for polystyrene while those without a subscript are for the test samples. In this method, $\alpha_{PS}=0.67$ and $K_{PS}=0.000175$, while $\alpha$ and K for other materials are as calculated and published in literature (Sun, T. et al. *Macromolecules* 2001, 34, 6812), except that for purposes of this invention and claims thereto, $\alpha=0.695$ and K=0.000579 for linear ethylene polymers, $\alpha=0.705$ and K=0.0002288 for linear propylene polymers, $\alpha=0.695$ and K=0.000181 for linear butene polymers, $\alpha$ is 0.695 and K is 0.000579*(1-0.0087*w2b+0.000018*(w2b)^2) for ethylene-butene copolymer where w2b is a bulk weight percent of butene comonomer, $\alpha$ is 0.695 and K is 0.000579*(1-0.0075*w2b) for ethylene-hexene copolymer where w2b is a bulk weight percent of hexene comonomer, and $\alpha$ is 0.695 and K is 0.000579*(1-0.0077*w2b) for ethylene-octene copolymer where w2b is a bulk weight percent of octene comonomer. Concentrations are expressed in g/cm$^3$, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the methyls per 1000 total carbons ($CH_3/1000$ TC) as a function of molecular weight. The short-chain branch (SCB) content per 1000 TC (SCB/1000 TC) is then computed as a function of molecular weight by applying a chain-end correction to the $CH_3/1000$ TC function, assuming each chain to be linear and terminated by a methyl group at each end. The weight % comonomer is then obtained from the following expression in which f is 0.3, 0.4, 0.6, 0.8, and so on for C3, C4, C6, C8, and so on co-monomers, respectively:

$w2=f*SCB/1000$ TC.

The bulk composition of the polymer from the GPC-IR and GPC-4D analyses is obtained by considering the entire signals of the $CH_3$ and $CH_2$ channels between the integration limits of the concentration chromatogram. First, the following ratio is obtained $$\text{Bulk IR ratio} = \frac{\text{Area of CH}_3 \text{ signal within integration limits}}{\text{Area of CH}_2 \text{ signal within integration limits}}.$$

Then the same calibration of the $CH_3$ and $CH_2$ signal ratio, as mentioned previously in obtaining the CH3/1000 TC as a function of molecular weight, is applied to obtain the bulk CH3/1000 TC. A bulk methyl chain ends per 1000 TC (bulk CH3end/1000 TC) is obtained by weight-averaging the chain-end correction over the molecular-weight range. Then $w2b=f*$bulk CH3/1000 TC bulk SCB/1000 TC=bulk CH31000 TC−bulk CH3end/1000 TC and bulk SCB/1000 TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972.):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle $\theta$, c is the polymer concentration determined from the IR5 analysis, $A_2$ is the second virial coefficient, $P(\theta)$ is the form factor for a monodisperse random coil, and $K_O$ is the optical constant for the system:

$$K_o = \frac{4\pi^2 n^2 (dn/dc)^2}{\lambda^4 N_A},$$

where $N_A$ is Avogadro's number, and (dn/dc) is the refractive index increment for the system. The refractive index, n=1.500 for TCB at 145° C. and λ=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1-0.00126*w2) ml/mg and $A_2$=0.0015 where w2 is weight percent butane.

Reference can be made to U.S. Pat. No. 6,525,157, whose test methods are also fully applicable for the various measurements referred to in this specification and claims and which contain more details on GPC measurements, the determination of ethylene content by NMR and the DSC measurements.

Introduction of Quenching Agent

As indicated above, a hydroxy-containing diaryl acetal compound (i.e. quenching agent) is introduced to the polymerization mixture in order to quench the polymerization mixture. In one or more embodiments, the quenching agent can be introduced as a neat material to the polymerization mixture. In other embodiments, the quenching agent can be diluted with a solvent or monomer prior to being introduced into the polymerization mixture. For example, in one embodiment, the quenching agent can be suspended in an aliphatic solvent, at ambient temperatures. Useful aliphatic solvents includes, but are not limited to, mineral oil, isohexane, and toluene.

In one or more embodiments, the quenching agent is introduced to the polymerization mixture after a desired monomer conversion is achieved. In one or more embodiments, the quenching agent is added to the polymerization mixture after a monomer conversion of at least 45%, in other embodiments at least 55% monomer conversion, and in other embodiments at least 65% monomer conversion. In these or other embodiments, the quenching agent is added to the polymerization mixture prior to a monomer conversion of 45%, in other embodiments prior to 55% monomer conversion, and in other embodiments prior to 65% monomer conversion. In one or more embodiments, the quenching agent is added after complete, or substantially complete, monomer conversion.

The amount of the quenching agent (i.e. hydroxy-containing diaryl acetal compound) introduced to the polymerization mixture may vary based upon several factors including the type and amount of catalyst used in the polymerization as well as the type of quenching agent. In one or more embodiments, the amount of quenching agent introduced to the polymerization mixture may be described with reference to the amount of polymer within the polymerization mixture (e.g. weight parts per million weight parts of the polymer). According to one or more embodiments, greater than 100 weight parts per million weight parts (wppm), in other embodiments greater than 200 wppm, and in other embodiments greater than 1,000 wppm hydroxy-containing diaryl acetal compound is introduced relative to the total weight of polymer within the polymerization mixture. In these or other embodiments, less than 10,000 wppm, in other embodiments less than 5,000 wppm, and in other embodiments less than 200 wppm hydroxy-containing diaryl acetal compound is introduced relative to the total weight of polymer within the polymerization mixture. In one or more embodiments, from about 100 to about 10,000 wppm, in other embodiments from about 200 to about 5,000 wppm, and in other embodiments from about 500 to about 2,000 wppm hydroxy-containing diaryl acetal compound is introduced relative to the total weight of polymer within the polymerization mixture.

In one or more embodiments, the quenching agent (i.e. hydroxy-containing diaryl acetal compound) may be added to the polymerization mixture at a location (e.g., within a vessel) where the polymerization of monomer takes place. In other embodiments, the polymerization mixture is removed from the vessel in which the polymerization takes place and the quenching agent is introduced to the polymerization mixture at a distinct location. For example, the quenching agent may be introduced to the polymerization mixture within downstream vessels including downstream reactors or tanks, in-line reactors or mixers.

In particular embodiments, the polymerization process is a continuous process where the introduction of the quenching agent occurs within a distinct zone of the process. For example, after the polymerization of monomer, which occurs within a particular zone of the process (e.g., a first zone), the polymerization mixture is removed from that zone and introduced to a subsequent zone, which may be referred to as a second zone, where the quenching agent is introduced to the polymerization mixture. In particular embodiments, the introduction of the quenching agent occurs within a zone sufficiently downstream from the zone where polymerization of monomer takes place.

Quenching Agent

In one or more embodiments, hydroxy-containing diaryl acetal compounds, which may be referred to as orbitol derivatives, include those compounds that have at least one hydroxy group and two or more aryl groups that are each linked through an acetal group to a single moiety (such as a carbon chain). In one or more embodiments, the hydroxy-containing diaryl acetal compounds employed in the present invention may be the condensation product of a reaction between a polyhydric alcohol and an aromatic aldehyde. Exemplary polyhydric alcohols include xylitol and sorbitol. Hydroxy-containing diaryl acetal compounds are described in U.S. Pat Publ. 2017/0341269 and U.S. Pat. No. 5,973,043, which are both incorporated herein by reference.

In one or more embodiments, the hydroxy-containing diaryl acetal compound may be defined by the formula:

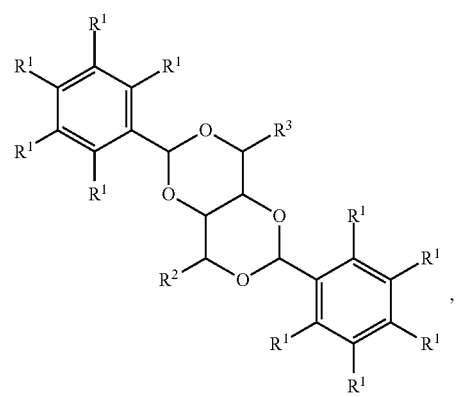

where each R1 is individually a hydrogen atom, a halogen atom, or a monovalent organic group, $R^2$ is a hydroxyalkyl group, and $R^3$ is a hydrogen atom or a monovalent organic group. In one or more embodiments, $R^2$ may be selected from —$CH_2OH$ and —$CHOHCH_2OH$. In one or more embodiments, the halogen atoms may be individually selected from fluorine, chlorine, bromine, and iodine. In one or more embodiments, the monovalent organic groups may be individually selected from hydrocarbyl groups and hydrocarbyloxy groups. The hydrocarbyl groups may be individually selected from alkyl, alkenyl, aryl groups, and the hydrocarbyloxy groups may be alkoxy groups such as —CH$_2$OH and —CHOHCH$_2$OH.

Specific examples of hydroxy-containing diaryl acetal compounds include 1,3:2,4-dibenzylidene sorbitol, 1,3:2,4-di(p-methylbenzylidene) sorbitol, 1,3:2,4-di(3,4-dimetyl-benzylidene) sorbitol, and 1,2,3-tridesoxy-4,6:5,7-bis-O-[(4-propylphenyl)methylene]nonitol sorbitol.

Separation

As indicated above, following the step of quenching the polymerization mixture, the polymer is then separated from the solvent and/or unreacted monomer within the polymerization mixture. In other words, after the addition of the quenching agent, the polymerization mixture includes polymer, catalyst residue, unreacted monomer, quenching agent and/or quenching agent residue, and optionally solvent, and efforts are made to separate the polymer product. As also indicated above, the quenching agent advantageously separates (which may also be referred to as partitions) with the polymer product. As a result, the separation step results in the formation of at least two streams. The first stream includes the polymer and the hydroxy-containing diaryl acetyl compound, and the second stream, which may also be referred to as a recycle stream, includes the unreacted monomer and the solvent. Advantageously, the second stream is free of or includes limited amounts of the quenching agent. In one or more embodiments, the first stream may also include a small amount of solvent. In certain embodiments, where additives are added prior to separation, the first stream may also include additives.

In one or more embodiments, the separation step can be performed as a liquid-liquid separation to produce a liquid-phase first stream and a liquid-phase recycle stream. Alternatively, the separation step can be performed as a vapor-liquid separation, which produces a liquid-phase first stream and a vapor-phase recycle stream. Suitable vessels for performing the separation step include flash vessels and high-pressure flash vessels.

In one or more embodiments, the liquid-liquid separation may be conducted at a temperature of from about 150° C. to about 300° C., in other embodiments about 150° C. to about 250° C., in other embodiments about 170° C. to about 230° C., and in other embodiments about 180° C. to about 210° C. In these or other embodiments, the liquid-liquid separation may be conducted with a pressure of about 375 to about 650 psig (2600 to 4500 kPag), in other embodiments about 400 to about 600 psig (2800 to 4100 kPag), and in other embodiments about 400 to about 500 psig (2800 to 3400 kPag).

In one or more embodiment, the liquid-vapor separation may be conducted at a temperature of from about 60° C. to about 200° C., in other embodiments about 70° C. to about 180° C., in other embodiments about 80° C. to about 170° C., and in other embodiments about 80° C. to about 150° C. In these or other embodiments, the liquid-vapor separation may be conducted with a pressure of about 40 to about 350 psig (280 to 2400 kPag), in other embodiments about 50 to about 300 psig (340 to 2100 kPag), in other embodiments about 70 to about 200 psig (480 to 1400 kPag), and in other embodiments about 80 to about 150 psig (550 to 1000 kPag).

As suggested above, the recycle stream is advantageously free of or only includes limited amounts of the quenching agent. In one or more embodiments, the recycle stream includes less than 10 weight parts per million weights parts (wppm), in other embodiments less than 7.0 wppm, in other embodiments less than 5.0 wppm, in other embodiments less than 2.0 wppm, in other embodiments less than 1.0 wppm, in other embodiments less than 0.10 wppm, and in other embodiments less than about 0.010 wppm of the quenching agent (i.e. hydroxy-containing diaryl acetyl compound) based upon the total concentration of the recycle stream. In one or more embodiments, the recycle stream includes an insubstantial amount or less of quenching agent, which refers to that amount or less of quenching agent that may be recycled back into the polymerization system without an appreciable decrease in polymerization performance.

In one or more embodiments, the separation step may take place at a location (e.g., within a vessel) where the quenching agent is introduced. In other embodiments, the polymerization mixture is removed from the vessel where the quenching agent is introduced to the polymerization mixture and the separation step takes place at a distinct location. For example, the separation step may take place within downstream vessels such as downstream flash vessels.

In particular embodiments, the polymerization process is a continuous process where the separation step occurs within a distinct zone of the process. For example, and as set forth above, after the polymerization of monomer, which occurs within a particular zone of the process (e.g., a first zone), the polymerization mixture is removed from that zone and introduced to a subsequent zone, which may be referred to as a second zone, where the quenching agent is introduced to the polymerization mixture. Following introduction of the quenching agent, the polymerization mixture is removed from that zone and introduced to a subsequent zone, which may be referred to as a third zone, where the separation step takes place. In particular embodiments, the separation step occurs within a zone sufficiently downstream from the zone where quenching takes place.

In one or more embodiments, where solvent remains in the first stream, the first stream may be subjected to a subsequent or additional devolatilization step to remove any additional solvent. In one or more embodiments, devolatilization may be performed using a devolatilization extruder, distillation, vacuum, a flash tank process, a vented extruder, or combination of two or more thereof.

Recycle

In one or more embodiments, the second stream may be recycled. That is, at least a portion of the second stream (i.e. the stream containing separated monomer and solvent) may be to be introduced back to the polymerization step. Advantageously, since the second stream is free of or only includes limited amount of the quenching agent, purification of the recycle stream to remove protic compounds can be eliminated or substantially reduced by practice of this invention. In one or more embodiments, where processing of the recycle stream is desired, the recycle stream may be processed using treater beds and/or scavengers known in the art.

Finishing

In one or more embodiments, the polymer along with the hydroxy-containing diaryl acetal compound may be pelletized after separation. For purposes of this specification, the polymer and the hydroxy-containing diaryl acetal compound may be referred to as the pelletization mixture. As indicated above, the hydroxy-containing diaryl acetal compound may act as a nucleating agent to promote and/or facilitate pellet formation.

In one or more embodiments, the pelletization mixture may be pelletized by first providing a molten polymer mixture (i.e. a mixture of the polymer and the hydroxyl-containing diaryl acetal compound), feeding the molten pelletization mixture into an extruder that transfers the pelletization mixture through a die that forms a polymer strand. This polymer strand is then cut into pellets. In one or more embodiments, the polymer strand is first cooled to solidify the polymer strand, and then the solidified strand is then cut into pellets. In other embodiments, underwater pelletization techniques are employed whereby the polymer strand is first cut into the pellets and the pellets are subsequently cooled. Other useful methods for pelletizing polymeric materials may also be used including, but not limited to, hot face, strand, and water ring pelletization techniques. Examples of useful underwater pelletizing devices can be found in U.S. Pat. Nos. 7,033,152 B2, 7,226,553 B2, and U.S. Application Publication No. 2007/0119286 A1, which are all incorporated herein by reference.

In particular embodiments, where an underwater pelletizer is used to pelletize the pelletization mixture, the pelletization mixture is extruded through a pelletizing die to form strands, the strands may then be cut by rotating cutter blades in the water box of the underwater pelletizer. Water continuously flows through the water box to further cool and solidify the pellets and carry the pellets out of the underwater pelletizer's water box for further processing.

In one embodiment, the pelletizing die is thermally regulated by means known to those skilled in the art in order to prevent die hole freeze-off.

In an embodiment, the underwater pelletizer uses chilled water, thus allowing for further rapid cooling of the pellets and solidification of the outermost layer of the pellets. In particular embodiments, the temperature of the water in the underwater pelletizing unit may be from about 1° C. to about 23° C. In particular embodiments, a water chilling system is employed to cool the water entering the underwater pelletizer water box (cutting chamber) to about 4° C.

In an embodiment, the underwater pelletizer unit has a chilled water slurry circulation loop, which inhibits the tendency of the pellets to stick together and allows the extruded polymer strands to be more cleanly cut. The chilled water slurry circulation loop extends from the underwater pelletizer, carrying the pellet-water slurry to a pellet drying unit, and then recycles the water back to the underwater pelletizer.

In an embodiment, the residence time of the pellets in the chilled water slurry circulation loop is at least 10 seconds, or at least 20 seconds, or at least 30 seconds, or at least 40 seconds, or at least 50 seconds or more. As fresh pellets tend to bridge and agglomerate if the pellets have not had adequate time to crystallize and harden, or if the polymer is a low crystallinity polymer, the pellets can be provided sufficient residence time in the pellet water loop.

In another embodiment, chilled water removes the pellets from the cutter blade and transports them through a screen that catches and removes coarsely aggregated or agglomerated pellets. The water then transports the pellets through a dewatering device and into a centrifugal dryer or fluidized bed to remove excess surface moisture from the pellets. The pellets may then pass through a discharge chute for collection or may proceed to additional processing such as, but not limited to, pellet coating, crystallization, or further cooling as required to achieve the desired product.

The pelletizing die can be used to make pellets in shapes not limited to spheres, rods, slats, or polygons. In particular embodiments, near spherical pellets are made. In one or more embodiments, a pellet shape that allows the pellets to easily flow is employed.

As the skilled person will appreciate, the speed at which the pelletizer operates is selected according to the die plate size, number of orifices in the die, and the parameters necessary to achieve desired pellet size and shape. The number of orifices in the die and the orifice geometry are selected as appropriate for the polymer feed flow rate and melt material as is known to those skilled in the art.

Optionally, an antiblocking agent may be added to the water in the underwater pelletizing water box or chilled water slurry loop. The addition of an antiblock to the pellet water loop is useful to prevent pellets from sticking together in the loop and plugging the lump catcher screen upstream of the dryer.

The temperature of the water, the rotation rate of the cutter blades, and the flow rate of the polymer melt through the pelletizing die all contribute to the production of proper pellet geometries. Additionally, the temperature of the pellets, both in the interior and the exterior, influence the formation of the pellets as well as the drying of the pellets.

In an embodiment, the pellets are dried after exiting the underwater pelletizing unit. Drying can be by any process, including centrifuge, fluid bed drier in which a heated gas (e.g., air) is passed through a fluidized bed of the pellets, or a flash dryer. In particular embodiments, the pellets are dried in a centrifugal dryer, which is connected to the outlet of the underwater pelletizing die. Examples of useful centrifugal driers are those available from Gala Industries, such as those disclosed in U.S. Pat. Nos. 6,807,748 B2; 7,024,794 B1; and 7,171,762 B2, all of which are incorporated herein by reference.

After drying, the pellets may be collected and batched or, alternatively, may proceed for additional processing such as further cooling or dusting/coating.

In one or more embodiments, the pellets are dusted/coated with an external antiblock. An external antiblock can be used to allow for easy flow of pellets through packaging equipment and to prevent agglomeration in the final product. Any antiblock known to be compatible with the polymer pellet may be used. In particular embodiments, the pellets may be dusted with the antiblock by mechanical mixing so that a consistent even coating of antiblock is formed on the pellet surface. Mechanical mixing of the pellets and antiblock allows for good antiblock coverage on the pellets and good adhesion/embedding of antiblock particles on the pellets.

SPECIFIC EMBODIMENTS

Paragraph A: A process for the synthesis of a granular polymer, the process comprising (a) providing an active polymerization mixture that includes polymer, monomer, catalyst and optional solvent; (b) introducing a hydroxy-containing diaryl acetyl compound to the active polymerization mixture to thereby provide an inactive polymer mixture; (c) separating the polymer solution into a first stream and a second stream, where the first stream includes the polymer and the hydroxy-containing diaryl acetyl compound, and the second stream includes the monomer and the optional solvent; and (d) fabricating granules from the first stream.

Paragraph B: The process of Paragraph A, where said step of providing an active polymerization mixture includes polymerizing propylene and an alpha-olefin comonomer.

Paragraph C: The process of one or more of Paragraphs A-B, where said polymer includes a propylene-based elastomer.

Paragraph D: The process of one or more of Paragraphs A-C, where the step of polymerizing employs a catalyst system, where the catalyst system includes a catalyst compound, an activator, and an optional co-activator.

Paragraph E: The process of one or more of Paragraphs A-D, where the catalyst system is a metallocene catalyst system.

Paragraph F: The process of one or more of Paragraphs A-E, where the hydroxy-containing diaryl acetyl compound is defined by the formula:

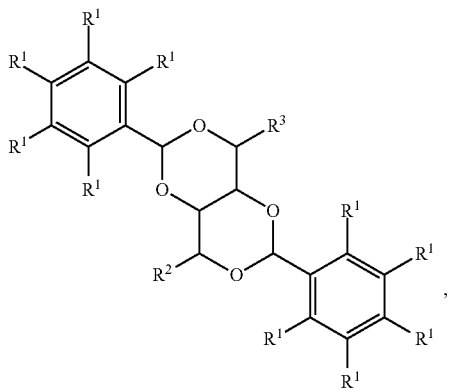

where each $R^1$ is individually a hydrogen atom or a monovalent organic group, $R^2$ is a hydroxyalkyl group, and $R^3$ is a hydrogen atom or a monovalent organic group.

Paragraph G: The process of one or more of Paragraphs A-F, where $R^2$ is —$CH_2OH$ or —$CHOHCH_2OH$.

Paragraph H: The process of one or more of Paragraphs A-G, where the hydroxy-containing diaryl acetyl compound is selected from 1,3:2,4-dibenzylidene sorbitol, 1,3:2,4-di(p-methylbenzylidene) sorbitol, 1,3:2,4-di(3,4-dimetylbenzylidene) sorbitol, and 1,2,3-tridesoxy-4,6:5,7-bis-O-[(4-propylphenyl)methylene]nonitol sorbitol.

Paragraph I: The process of one or more of Paragraphs A-H, where said step of introducing includes introducing from about 100 to about 10,000 weight parts per million weight parts of the hydroxy-containing diaryl acetyl compound to the active polymerization mixture.

Paragraph J: The process of one or more of Paragraphs A-I, where said step of separating includes liquid-liquid separation.

Paragraph K: The process of one or more of Paragraphs A-J, where said step of separating includes liquid-vapor separation.

Paragraph L: The process of one or more of Paragraphs A-K, where the second stream includes less than 10 wppm of the hydroxy-containing diaryl acetyl compound relative to the total weight of the stream.

Paragraph M: The process of one or more of Paragraphs A-L, where said step of fabricating granules includes fabricating pellets.

Paragraph N: The process of one or more of Paragraphs A-M where said step of fabricating granules includes pelletizing the polymer.

Paragraph O: The process of one or more of Paragraphs A-N where said step of pelletizing includes underwater pelletization.

Paragraph P: A process for the synthesis of a granular polymer, the process comprising (a) polymerizing one or more monomers in the presence of a solvent within a first zone to produce an active polymer mixture including solvent, polymer, and monomer; (b) inactivating the active polymerization mixture by introducing a hydroxy-containing diaryl acetyl compound to the active polymer mixture within a second zone to thereby produce a polymerization mixture including inactive polymer, inactive catalyst, monomer, and solvent; (c) separating the polymerization mixture within a third zone, where said step of separating produces a first stream and a second stream, where the first stream includes the polymer and the hydroxy-containing diaryl acetyl compound, and the second stream includes the monomer and the solvent; and (d) fabricating granules from the first stream.

In order to demonstrate the practice of the present invention, the following examples have been prepared and tested. The examples should not, however, be viewed as limiting the scope of the invention. The claims will serve to define the invention.

EXAMPLES

Experiments were conducted to evaluate the present invention. Specifically, 1,3:2,4-di(3,4-dimethylbenzylidene) sorbitol (DMDBS), which is a hydroxy-containing diaryl acetal compound, was used to quench an olefin polymerization reaction, and this quenching agent was also tested for its nucleating effectiveness when used in conjunction with a particular polyolefin (i.e. a propylene-based elastomer).

Quenching

In order to evaluate the quenching capability of DMDBS, a sample of DMDBS (10 mL) was combined with toluene (4 mL). The mixture was shaken vigorously to form a suspension. The mixture was shaken immediately prior to use.

Four active catalyst mixtures were prepared within vials, which are identified in Table 1 below, according to the following procedure. To each vial was added, 1 mM (p-Et3Si-phenyl)2C(2,7-tBu2Flu)(Cp)HfMe2 dissolved in toluene (0.5 mL, 500 nmol), and 1 mM [PhNMe2H][B(C6F5)4] dissolved in toluene (0.5 mL, 500 nmol). Then, the suspension of the DMDBS was added to each vial (amounts indicted in Table 1). The vials were shaken gently and allowed to sit for about 5 minutes. Then, 1-hexene (0.2 mL) was added to each vial. The vials were capped and heated to 80° C. After a few minutes, the following observations were made. Vial-Control was clear and pale purple in color. Vial-A was clear and orange in color. Vial-B and Vial-C were cloudy and yellow-orange in color.

After about 30 minutes, the vials were uncapped and allowed to evaporate at 160° C. for about 1 hour. Each vial was then weighed to determine the amount of non-volatile residue. The results of this evaporation test are set forth in Table 1.

TABLE 1

Summary of Quenching Tests

| Vials | DMDBS Weight (mg) | Total Weight Before Evaporation (mg) | Residual Weight After Evaporation (mg) | Hexene Conversion |
|---|---|---|---|---|
| A | 0.25 | 136.7 | −1.7 | −1.2% |
| B | 1.25 | 136.7 | −1.0 | −0.7% |
| C | 2.50 | 139.0 | −1.3 | −0.9% |
| Control | 0.00 | 136.5 | 109.5 | 80.2% |

As the skilled person will appreciate, the active catalyst mixtures prepared in each vial would have polymerized hexene as demonstrated in Vial-Control, but the presence of DMDBS in Vial-A, Vial-B, and Vial-C quenched the catalyst as evidenced by the lack of hexene polymerization. DMDBS was therefore found to be effective at completely quenching the activated metallocene catalyst. The average quenching efficiency of DMDBS was calculated to be about 0.0018 g quench/g polymer. Therefore, it was concluded that these hydroxy-containing diaryl acetal compounds can serve as a class of effective quenching agents.

Nucleating

In order to evaluate the nucleating capability of DMDBS, DMDBS was homogeneously blended with a propylene-based elastomer using a twin screw extruder. The propylene-based elastomer was commercially available under the tradename VISTAMAXX 6202 (ExxonMobil). Four samples were prepared and the isothermal crystallization rates of each sample were analyzed and the results thereof are provided in Table 2 below.

The isothermal crystallization rates of the blends were measured using high-speed differential scanning calorimetry (Hyper-DSC). In order to simulate the transient heat transfer between molten polymers and pelletizing water, the cooling rate was set as 750° C./min. The isothermal dwelling temperatures were selected to range from 10° C. to 40° C. During the test, the sample was first heated up to 170° C. and then cooled to the designated isothermal temperature with ballistic cooling. The sample was held for 20 minutes for isothermal crystallization. The crystallization half-times were calculated based on the integrated heat flow across elapsed time.

TABLE 2

Crystallization Half-Time of Propylene-Based Elastomer & DMDBS Blend in Isothermal Crystallization

| | | DMDBS Weight Fraction in Vistamaxx 6202 | | | |
| --- | --- | --- | --- | --- | --- |
| | | Sample 1 | Sample 2 | Sample 3 | Sample 4 |
| Crystallization | | 0 ppm | 100 ppm | 500 ppm | 1000 ppm |
| Temperature | 10° C. | 4.0 min | 3.8 min | 3.7 min | 1.140 min |
| | 25° C. | 3.4 min | 2.8 min | 2.7 min | 0.573 min |
| | 40° C. | 6.7 min | 4.4 min | 3.6 min | 0.620 min |

Based upon the data within Table 2, and specifically by comparing the crystallization half-times of the blends, the skilled person can conclude that the addition of DMDBS increases the crystallization rate of the propylene-based elastomer. Notably, the higher the fraction of DMDBS added, the faster the crystallization of elastomers. Moreover, similar results are observed at different temperatures ranging from 10° C. to 40° C., which temperatures are indicative of the temperatures typically experienced when employing underwater pelletization techniques.

Various modifications and alterations that do not depart from the scope and spirit of this invention will become apparent to those skilled in the art. This invention is not to be duly limited to the illustrative embodiments set forth herein.

What is claimed is:

1. A process for the synthesis of a granular polymer, the process comprising:

(a) providing an active polymerization mixture that includes polymer, monomer, catalyst and optional solvent;

(b) introducing a hydroxy-containing diaryl acetyl compound to the active polymerization mixture to thereby provide an inactive polymer mixture;

(c) separating the inactive polymer mixture into a first stream and a second stream, where the first stream includes the polymer and the hydroxy-containing diaryl acetyl compound, and the second stream includes the monomer and the optional solvent; and (d) fabricating granules from the first stream.

2. The process of claim 1, where said step of providing an active polymerization mixture includes polymerizing propylene and at least one other alpha-olefin comonomer.

3. The process of claim 2, where said polymer includes a propylene-based elastomer.

4. The process of claim 1, where the step of polymerizing employs a catalyst system, where the catalyst system includes a catalyst compound, an activator, and an optional co-activator.

5. The process of claim 4, where the catalyst system is a metallocene catalyst system.

6. The process of claim 1, where the hydroxy-containing diaryl acetyl compound is defined by the formula:

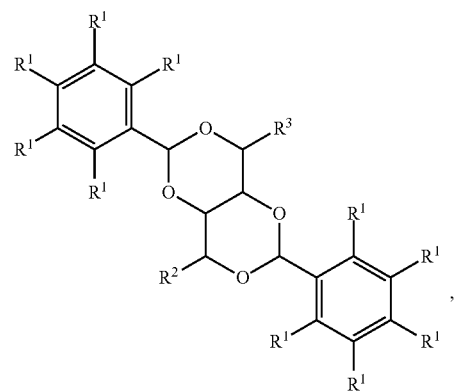

where each $R^1$ is individually a hydrogen atom or a monovalent organic group, $R^2$ is a hydroxyalkyl group, and $R^3$ is a hydrogen atom or a monovalent organic group.

7. The process of claim 6, where $R^2$ is —$CH_2OH$ or —$CHOHCH_2OH$.

8. The process of claim 1, where the hydroxy-containing diaryl acetyl compound is selected from 1,3:2,4-dibenzylidene sorbitol, 1,3:2,4-di(p-methylbenzylidene) sorbitol, 1,3:2,4-di(3,4-dimetylbenzylidene) sorbitol, and 1,2,3-tridesoxy-4,6:5,7-bis-O-[(4-propylphenyl) methylene] nonitol sorbitol.

9. The process of claim 1, where said step of introducing includes introducing from about 100 to about 10,000 parts per million by weight of the hydroxy-containing diaryl acetyl compound, based on total weight of the active polymerization mixture.

10. The process of claim 1, where said step of separating includes liquid-liquid separation.

11. The process of claim 1, where said step of separating includes liquid-vapor separation.

12. The process of claim 1, where the second stream includes less than 10 wppm of the hydroxy-containing diaryl acetyl compound relative to the total weight of the stream.

13. The process of claim 1, where said step of fabricating granules includes fabricating pellets.

14. The process of claim 1, where said step of fabricating granules includes pelletizing the polymer.

15. The process of claim 14, where said step of pelletizing includes underwater pelletization.

16. A process for the synthesis of a granular polymer, the process comprising:
 (a) polymerizing one or more monomers in the presence of a solvent within a first zone to produce an active polymer mixture including solvent, polymer, and monomer;
 (b) inactivating the active polymerization mixture by introducing a hydroxy-containing diaryl acetyl compound to the active polymer mixture within a second zone to thereby produce a polymerization mixture including inactive polymer, inactive catalyst, monomer, and solvent;
 (c) separating the polymerization mixture within a third zone, where said step of separating produces a first stream and a second stream, where the first stream includes the polymer and the hydroxy-containing diaryl acetyl compound, and the second stream includes the monomer and the solvent; and
 (d) fabricating granules from the first stream.

17. The process of claim 3, where the propylene-based elastomer comprises propylene derived units and from about 3.0 to about 25 wt % ethylene-derived units, based upon the entire weight of the polymer.

18. The process of claim 17, where the propylene-based elastomer has a melting temperature (Tm) of about 85° C. to about 120° C.

19. The process of claim 18, where the propylene-based elastomer has a heat of fusion (Hf) of less than about 80 J/g.

20. The process of claim 1, where the catalyst system is a metallocene catalyst system; the hydroxy-containing diaryl acetyl compound is selected from 1,3:2,4-dibenzylidene sorbitol, 1,3:2,4-di(p-methylbenzylidene) sorbitol, 1,3:2,4-di(3,4-dimetylbenzylidene) sorbitol, and 1,2,3-tridesoxy-4,6:5,7-bis-O-[(4-propylphenyl) methylene] nonitol sorbitol; and the active polymerization mixture comprises about 100 to about 10,000 parts per million by weight of the hydroxy-containing diaryl acetyl compound.

* * * * *